HOT TOP BOTTOM RING AND METHOD FOR FORMING SAME

Original Filed May 5, 1961 3 Sheets-Sheet 1

INVENTORS.
DAROLD W. THIEM
GORDON W. GOTTSCHALK
BY Dominik, Lazo & Worth
ATTORNEYS HOT TOP BOTTOM RING AND METHOD FOR FORMING SAME
Original Filed May 5, 1961
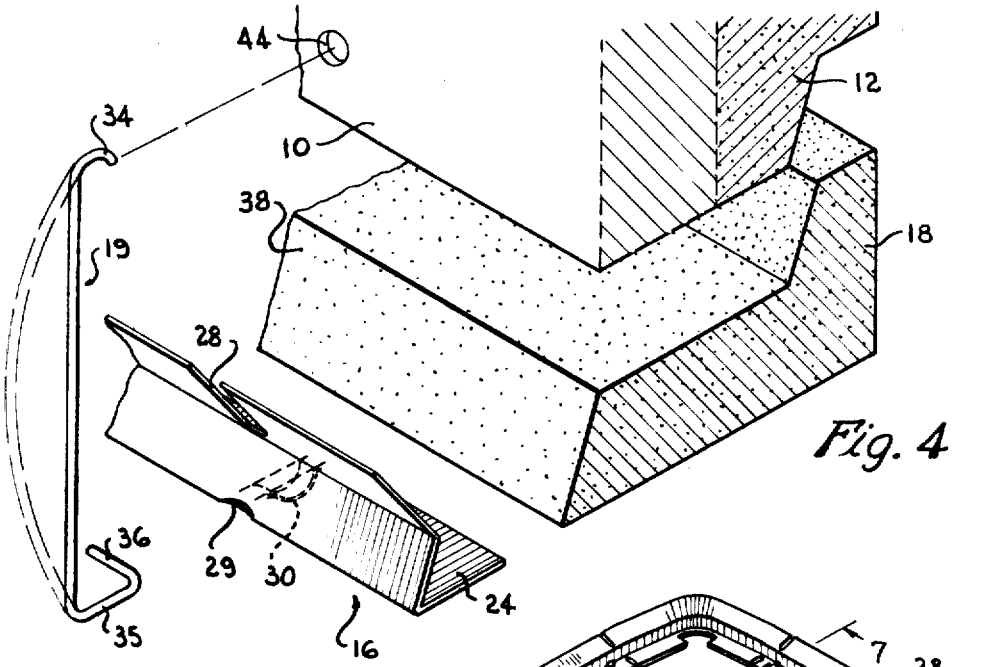
Fig. 4
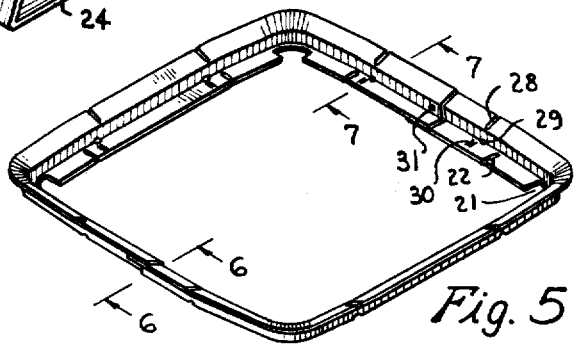
Fig. 5
Fig. 6
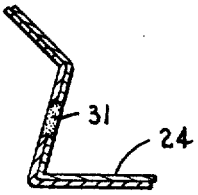
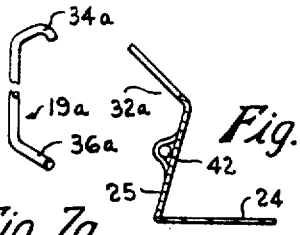
Fig. 7b
Fig. 7a
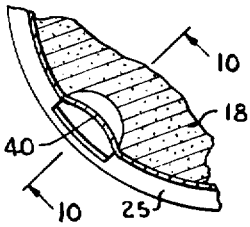
Fig. 9
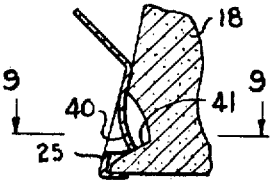
Fig. 10
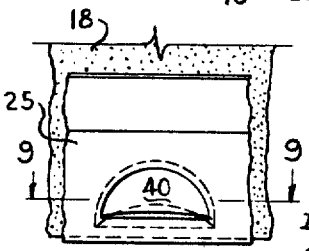
Fig. 8
INVENTORS.
DAROLD W. THIEM
GORDON W. GOTTSCHALK
BY
Dominik, Lago & Worth
ATTORNEYS

HOT TOP BOTTOM RING AND METHOD FOR FORMING SAME

Original Filed May 5, 1961 3 Sheets-Sheet 3

INVENTORS.
DAROLD W. THIEM
GORDON W. GOTTSCHALK
BY Dominik, Lago & Worth
ATTORNEYS United States Patent Office Re. 26,381
Reissued Apr. 23, 1968

26,381
HOT TOP BOTTOM RING AND METHOD FOR FORMING SAME

Darold W. Thiem, Elm Grove, and Gordon W. Gottschalk, Hales Corners, Wis., assignors to Universal Refractories Corporation, Milwaukee, Wis.

Original No. 3,110,942, dated Nov. 19, 1963, Ser. No. 108,203, May 5, 1961. Application for reissue Aug. 16, 1965, Ser. No. 485,145
10 Claims. (Cl. 249—202)

Matter enclosed in heavy brackets [ ] appears in the original patent but forms no part of this reissue specification; matter printed in italics indicates the additions made by reissue.

*ABSTRACT OF THE DISCLOSURE*

*A hot top bottom ring having a wiper strip securely mounted in a flush relationship to the corner formed by the intersection of the base face and edge face of the refractory ring and the method used to accomplish this result.*

The present invention relates to a hot top ring, and more particularly to a unique configuration of a hot top bottom ring and its associated wiper strip. The invention also relates to a method of making a hot top bottom ring.

In the steel industry, and particularly where high grade steels are being poured, a mechanism known as a "hot top" is employed in order to confine the area of "piping" to a small portion of the amount of steel poured. Piping is that phenomena which occurs when the metal chills in solidification and a central tubular core, much in the shape of a whirlpool, develops at the top of the mold. By confining this area of shrinkage to a volume much smaller than that of the ingot itself, the portion which need be cropped off before rolling, or otherwise processing the steel, is held to an irreducible minimum.

The hot top is normally a metallic tubular member with suitable means for elevating and placing into position on top of the mold which is ready for pouring. While most hot tops are constructed of a metal outer portion, and an inner refractory lining, the invention is not intended to be limited to such construction, but relates to any type of hot top construction employed in confining the area of piping and waste in a mold.

More specifically, the invention relates to a ring which is attached to the bottom portion of the hot top. The ring comprises a refractory main body portion, and a wiper strip. The wiper strip serves the general function of a gasket which contacts the sidewalls of the ingot, and provides sufficient flexibility so that variation in size from ingot mold to ingot mold will be readily accommodated, and a seal effected between the hot top and the inner walls of the ingot mold. While the hot top and the bottom ring may be of substantial thickness, the wiper, it has been found in practice, may be of a thin gauge metal. The action of the steel when it rises in the mold is to contact the wiper strip and chill quickly, and then move up through the hot top central open area. Thus only fairly substantial contact between the wiper and the wall of the ingot mold is required. The subject invention deals primarily with the configuration of the hot top bottom ring and its associated wiper strip.

One of the primary objects of the invention, bearing in mind that a refractory material is frangible, is to provide a wiper strip which strengthens the hot top bottom ring refractory body, and holds to a minimum the amount of damage which may be caused to the ring both in transit, and in positioning with the ingot mold.

Another object of the present invention is to provide a hot top bottom ring with an associated wiper, the construction of which permits sufficient flexibility to accommodate a wide variation in ingot mold interior dimensional characteristics.

Still another object of the present invention is to provide a hot top bottom ring which is inherently inexpensive to manufacture due to the adaptability of the wiper strip configuration to roll forming for a wide variety of ring sizes. This advantage is brought about by the fact that many of the steel mills change their ingot sizes from time to time, and where a stamping is employed for the wiper strip, a new stamping die must be provided at substantial expense each time such an ingot change occurs.

Still another object of the invention is to provide a hot top bottom ring with a wiper strip which can be manufactured and assembled in quantity, and shipped to remote locations for assembly with the refractory rings of varying sizes at reduced expense in shipping costs.

Still a further object of the present invention is to provide a hot top bottom ring with a wiper strip which is adaptable to the usage of hanging clips which are held to a minimum in length and a maximum in utility by virtue of their attachment to the wiper strip itself. A related object of the invention is to provide a hot top bottom ring and wiper strip construction in which the hanging clip is recessed from the edge portion of the hot top bottom ring to a maximum degree to avoid interference with the sealing effect of the wiper strip.

Even a further object of the present invention looks to the attachment of the wiper strip to the hot top bottom ring by means of a simple two-position welding which simultaneously positions the wiper strip, and to a degree pre-stresses the wiper strip around the hot top bottom ring to serve the twofold purpose of secure attachment and compressibly strengthening the hot top bottom ring.

Still another object of the invention is to furnish a hot top construction with a wiper ring which facilitates the assembly of a unitary hot top, and at the same time serves the function of a wiper strip and gasket.

A further object of the invention is to provide a method for constructing a hot top having a wiper ring.

Further objects and advantages of the present invention will become apparent as the following description of an illustrative embodiment proceeds, taken in conjunction with the accompanying drawings in which:

FIG. 4 is an enlarged, partially broken, partially sectioned, exploded view of the hot top bottom ring refractory, wiper, clips and hot top, illustrating their assembled relationship.

FIG. 5 is a perspective view of the hot top bottom ring wiper assembly.

FIG. 6 is a transverse sectional view in enlarged scale of the wiper strip taken along section line 6—6 of FIG. 5, showing the overlapping portion of the two elements of the wiper strip and the welded joint.

FIGS. 7a and 7b are, respectively, a view of another embodiment of a clip and a transverse sectional view in enlarged scale of another embodiment of the hot top bottom ring wiper taken along section line 7—7 of FIG. 5 illustrating the configuration of the clip mounting assembly at the lower portion of the wiper strip.

FIG. 8 is a partially broken front elevation of an alternative embodiment of an anchor means.

FIG. 9 is a transverse view of the alternative embodiment attachment taken through section line 9—9 of FIG. 8.

FIG. 10 is a transverse partially broken, partially sectioned view of a corner of the bottom ring taken along section line 10—10 of FIG. 9.

Figure 1:
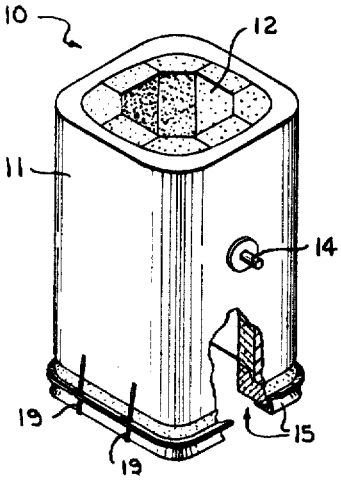
FIG. 1 is a perspective view of a typical hot top showing the illustrative hot top bottom ring in partially broken sectioned form.

Turning now to FIG. 1 of the drawings, it will be seen that the invention finds its maximum utility in a hot top 10. The hot top comprises a hot top case 11, normally cast of metal, with a pair of opposed hot top handles 14 which are suitable for removable securement to a hook from an overhead crane so that the hot top can be moved into position in the top of an ingot mold prior to pouring the steel. The inner wall of the hot top case 11 is lined with a hot top liner 12. The liner 12 is made up of individual refractory bricks which are mortared or cemented into position with each individual hot top as it is prepared for pouring.

It will be appreciated by reference to FIG. 11, an alternative embodiment of the subject invention, that the employment of a precast slab-type hot top is also possible, and that a wiper ring in accordance with the present invention may be embodied in such a construction, as will be outlined in greater detail hereinafter.

The present invention concerns itself primarily with the configuration and construction of the hot top bottom ring 15 which is secured to the lower portion of the hot top 10. The hot top bottom ring assembly 15 serves the function of first contacting the metal as it moves upwardly within the ingot mold, and supporting the wiper ring 16, the lip 20 of which contacts the interior wall of the ingot mold and forms a seal so that the molten metal will move up into the open area inside the hot top 10 and chill within the open area. The chilling action is accompanied by a piping effect which causes the top of the metal to appear in cross-section somewhat like a whirlpool. By confining the piping to area inside the hot top 10, the amount of metal which must be cut off before the ingot can be processed is held to a minimum.

The hot top bottom ring assembly 15 comprises, as pointed out above, a wiper ring as well as refractory ring 18. The refractory ring 18 is formed of a refractory material held together with a binder, and baked or otherwise solidified by a bonding action at the manufacturing point. After the hot top ring has been completely assembled, it is then secured to the hot top 10 by means of the attachment clips 19.

Figure 2:
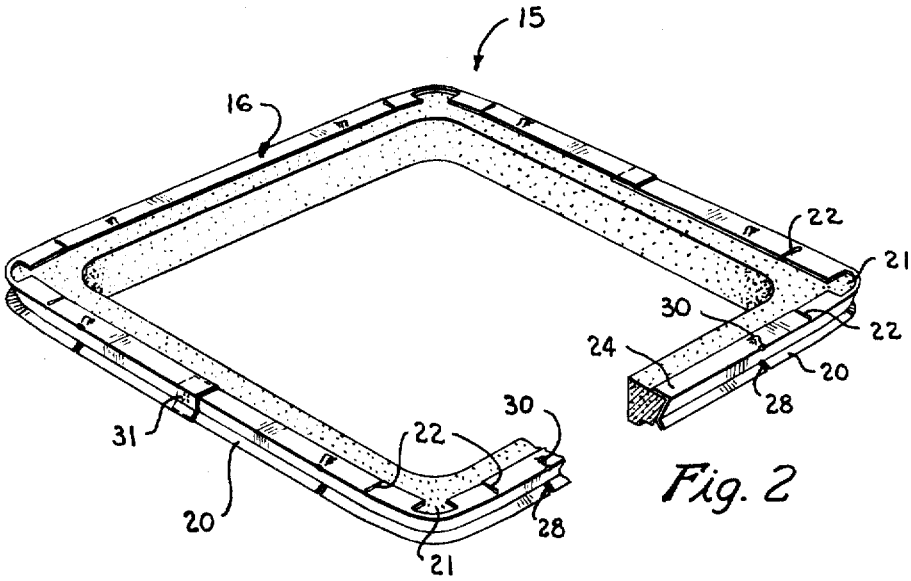
FIG. 2 is a perspective, partially broken, partially sectioned, view of the hot top bottom ring shown in the lower portion of FIG. 1, but inverted from the position as shown in the assembled view in FIG. 1.

Referring now to FIG. 2 it will be seen that the subject hot top ring 15 is provided with a wiper ring 16 which is made in two parts. Each of the parts is formed in a generally U-shaped configuration. The parts are so formed that they overlap at opposed portions along the hot top ring 15 and are then welded at that point by means of a single spot weld 31 (see FIG. 6).

One of the distinct advantages achieved by providing a hot top wiper ring 16 such as the type disclosed is that the entire wiper ring 16 can be formed by rolling. Heretofore various hot top wiper rings have been employed, but normally they are formed by means of stamping which, although inherently an inexpensive process, becomes exceedingly expensive when the cost of the stamping die is figured into the job. This arises from the fact that quite often the various steel mills change the size of the interior portion of their ingot molds, and a new stamping die must be purchased each time the ingot mold is changed. Also, there are many steel mills that are relatively small in size, or pour very few hot tops, and it is uneconomical for a manufacturer of hot top rings to purchase dies for the small quantities of rings that would be purchased. In this manner, where the hot top wiper ring 16 can be roll-formed, and then simply stamped to various lengths, and curved to various sizes, the expensive die cost is eliminated, and standardized tooling can be used to form the hot top wiper ring to the particular configuration of ingot involved. The molds for the refractory ring 18 are far less expensive, and susceptible of modification so that by employing the unique combination, substantial economies in operation can be achieved, and in addition the full encasement of the refractory ring 18 by the wiper ring 16 serves to reinforce the entire construction, and the wiper ring base 24 serves to prevent broken portions of the refractory ring 18 from falling into the mold.

Some of the forming operations which are performed on the wiper ring are illustrated in FIG. 2 where the hot top ring 15 has been inverted. There it will be seen that corner relief 21 is provided in each of the corners so that the base 24 is not crimped. In addition, relief slots 22 are also provided in the wiper ring base 24 to accommodate the modest curvature along the edge of the hot top refractory ring 18.

Figure 3:
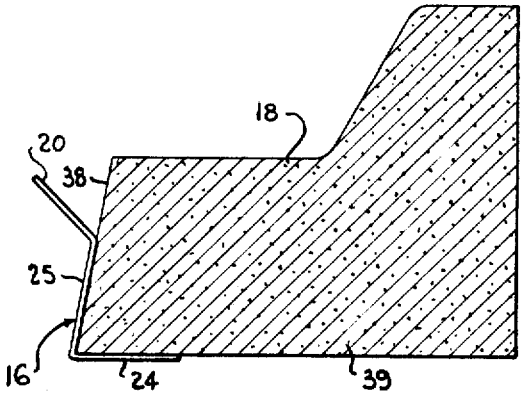
FIG. 3 is a transverse sectional enlarged view of the hot top bottom ring and its associated wiper strip taken along the broken sectioned area shown in FIG. 2.

As will be observed in FIG. 3, an acute angle (preferably 83°) is defined between the wiper ring base 24 and the wiper ring edge 25. This acute angle differs from the acute angle (preferably 85°) defined between the refractory ring base 39 and the refractory ring face 38. Thus when the wiper ring 16 is securely over-lapped and welded into place, as shown in FIG. 2, the angularity between the wiper ring faces and the faces of the refractory ring 18 serve to deformingly lock the wiper ring 16 to the refractory ring 18 and prestress the same, so that the wiper blade 20, when contacting the interior portion of the ingot, will not be dislodged.

In order to attach the hot top ring 15 to the hot top 10, it was pointed out above that clips 19 are employed. The clip 19 is attached to an attachment clip anchor loop 30 (see FIGS. 4 and 7), which in turn cooperates with an attachment clip blade slot 28 and an attachment clip ring notch 29. Ordinarily, the clips 19 are employed in pairs with one of each pair disposed on opposite sides of the hot top.

The attachment clip 19, as shown in FIG. 4, comprises a single bent metallic member which has an attachment clip body portion which extends from the bottom of the refractory ring 19 to the anchor hole 44 in the exterior casing 11 of the hot top. At the upper portion of the attachment clip 19 is an attachment clip hook 34. At the bottom portion is an attachment clip ring support 35 and an attachment clip anchor 36. The attachment clip anchor 36 fits within the open portion defined by the attachment clip anchor loop 30 in the wiper ring base 24. The attachment clip hook 34 then fits within the anchor hole 44 in the hot top case 11, and the entire hot top ring 15 is thereby firmly secured to the hot top assembly 10.

As will be observed in the phantom lines in FIG. 4, the attachment clip 19 may have its body portion normally bowed in order to provide further yieldable contact when attached in its interlocking relationship between the refractory body and the wiper ring. When assembling the wiper ring to the body the clip 19 is straightened, thereby lengthening it, so that it readily stretches between the wiper ring and the body; the respective parts are moved into position; and the clip 19 is allowed to spring back to its normally bowed position thereby pulling the wiper ring snugly up against the body.

Figure 11:
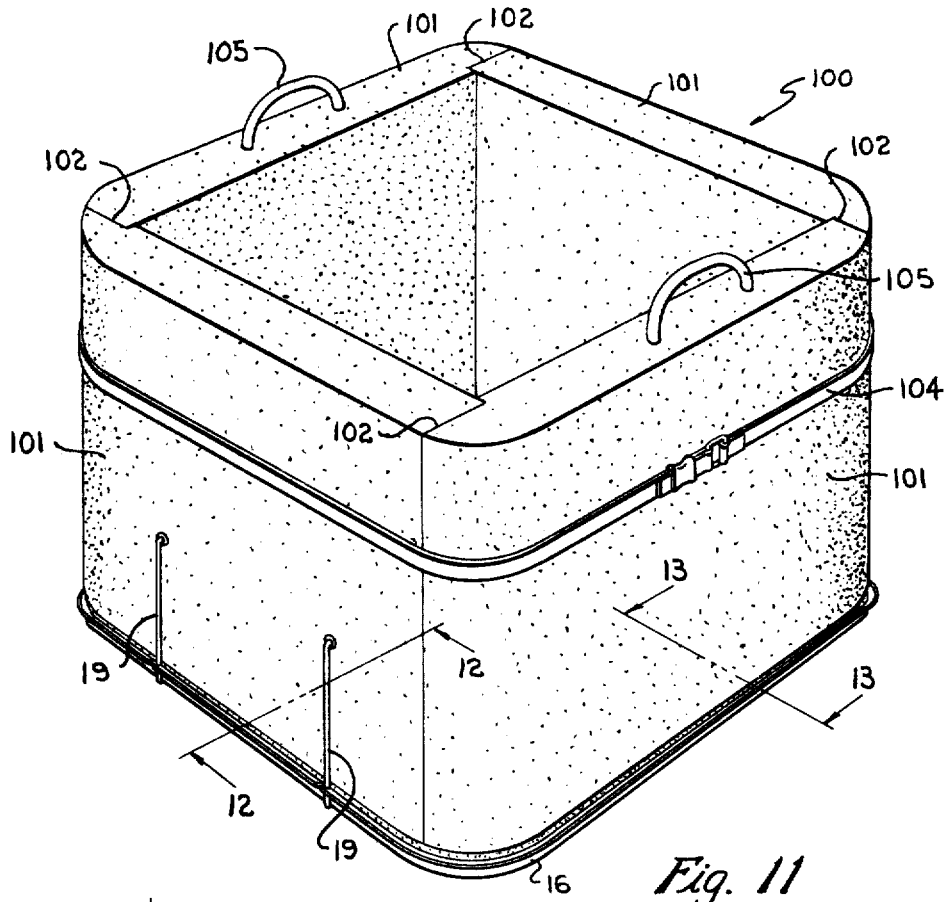
FIG. 11 is a perspective view of an alternative embodiment of the subject invention showing the wiper ring at the bottom of a disposable hot top, the entire construction of which is fabricated from molded slabs.

As indicated above, an alternative employment of the wiper ring 16 is illustrated in FIG. 11. There it will be seen that the hot top 100 is made up of four hot top slabs 101 (by contrast with the monolithic ring 18) which in turn are dovetailed at a corner joint 102 and held together with a steel band 104. A pair of lifting rings 105 are embedded in opposed slabs 101 in order to lift and lower the alternative embodiment hot top into position within the ingot mold. A mounting clip 19, as disclosed in the first-described embodiment, may be employed as illustrated in FIGS. 11 and 12 for reinforcing the attachment of the wiper ring 16 to the hot top slab 101.

Figure 12:
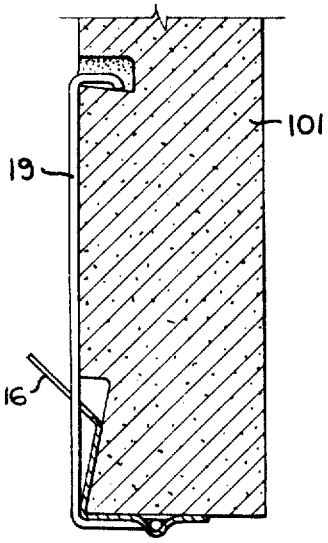
FIG. 12 is a transverse partially broken sectional view taken along section line 12—12 of FIG. 11.

As illustrated in FIG. 12, the attachment of the mounting clip 19 is for all practical purposes identical with that stated for the first-described embodiment.

Figure 13:
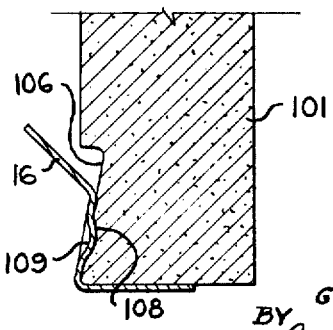
FIG. 13 is a transverse sectional view of the alternative embodiment taken along section line 13—13 of FIG. 11 illustrating the relationship between the wiper strip and the bottom of the refractory slab in a construction where the mounting clip is not employed.

Additionally, a further alternative construction is shown in FIG. 13 wherein the wiper ring 16 rests against the oblique refractory face 106 which is provided with a precast recess 108. The metal on the wiper strip is then deformed by denting or pressing a detent 109 into its face in order to permanently lock it to the refractory slab 101. The deformation serves the twofold purpose of additionally locking the wiper 16 in place, and also shortening the length of the wiper ring 16, to contract it around the refractory slabs 101.

In this regard, it has been observed that the prestressing of the refractory which is accomplished by foreshortening the wiper ring as illustrated here, or compressing the wiper ring segments before welding, or by pre-heating the wiper ring and welding while hot and permitting to shrink, serve to greatly reinforce the strength of the refractory itself which has excellent strength in compression, but is highly frangible and susceptible of breakage when sharply bumped or otherwise subjected to shock loading.

An alternative location for the anchor loop is shown in FIGS. 7*a* and 7*b* at 42. When this configuration is used with the alternative anchor loop 42 along the wiper ring edge 25, the clip 19a is shortened, and the attachment clip anchor 36a extends directly laterally from the body 32a of the attachment clip.

Still another alternative technique for securing the wiper ring 16 is shown in FIGS. 8 through 10. There it will be seen that an anchor tab 40 with the configuration defined by a crescent cut is stamped in the front edge 25 of the wiper ring, and is then depressed or deformed inwardly as shown in FIG. 10 so that the lower edge of the crescent-shaped tab 40 abuts the anchor tab ledge 41 which is cast into the refractory ring 18. In this manner, in addition to the inter-locking action which takes place between the acute angle of the wiper ring 16 and the refractory ring 18, there is also provided a positive lock for additional security. This embodiment is advantageously disposed at a corner (FIG. 9) and can also be located along the straight portions of the bottom ring.

In review it will be seen that there has been described and shown a hot top bottom ring which comprises primarily three elements: a refractory ring 18, a wiper ring 16, and one of the attachment means 19, 19a, 40. The construction of the wiper ring is coordinated with the configuration of the refractory ring so that when the wiper ring is fully wrapped around the refractory ring, a complete encasement and interlocking relationship is established. Thereafter, the attachment clips may be readily inserted into the metal wiper ring 16 and attach the entire hot top bottom ring 11 to the hot top assembly 10. The wiper ring serves the threefold function of anchoring the attachment clips, encasing and reinforcing the refractory ring, and supporting the wiper blade at a lower level in the ring itself. Additionally, unusual economies in operation as well as in cost may be achieved by the construction of a wiper ring 16 which is susceptible of manufacture for a wide variety of sizes from a single rolling die.

The instant invention also comprehends a unique method of manufacturing bottom rings. One of the steps in this method includes surrounding a refractory ring with a wiper ring formed from a piece of strip material and having the wiper blade resiliently supported therefrom. The wiper blade is supported from the body of the wiper ring. The body of the wiper ring is shaped or contoured to matingly and snugly engage a flange protruding from the bottom ring, the flange member having been exemplified above by the two faces 38, 39, disposed at acute angles to each other. In order to carry out the step of surrounding the refractory ring with the wiper ring, both of the rings can be prefabricated prior to carrying out the surrounding step; alternatively, the wiper ring can be preformed and the bottom ring cast or molded thereto. When forming the wiper ring, it is, of course, contemplated that the requisite portions *forming corner relief 21 and relief slots 22* will be removed therefrom to enable bending at corners and to provide slots such as 28, if required, for any attaching means.

A further modification in the method of manufacture contemplates the placing of the wiper ring in a core box prior to the pouring of the refractory sand therein, and then molding and subsequently baking the units in an integral fashion. A further method for manufacture contemplates the placing of the wiper ring on top of the refractory ring after it comes out of the baking oven. This will expand the parts of the wiper ring which is made of material approximately .025" thick, prior to clamping on the outside of the wiper ring and welding. Since the coefficient of thermal expansion of the metal is greater than that of the refractory, when the metal is welded in a hot condition, it shrinks more than the refractory upon cooling. This shrinkage action will firmly bind the metal wiper ring around the refractory ring.

Although a particular embodiment of the invention has been shown and described in full here, there is no intention to thereby limit the invention to the details of such embodiment. On the contrary, the intention is to cover all modifications, alternative embodiments, usages and equivalents of the hot top bottom ring as fall within the spirit and scope of the invention, specification, and appended claims.

We claim:

1. A hot top bottom ring comprising, in combination, a refractory ring having an open center, said ring having a base face and an edge face, the edge face defining an acute angle with the base face, a wiper ring, said wiper ring having a base leg and edge leg intersecting at an angle corresponding to said refractory ring acute angle, said wiper ring being mounted on said refractory ring with the respective base and edge members substantially flush with one another, and a wiper blade formed integral with and extending outwardly from the edge leg of the wiper ring.

2. A hot top bottom ring comprising, in combination, a refractory ring having an open center, said ring having a base face and an edge face, the edge face defining an acute angle with the base face, a wiper ring, said wiper ring having a base leg and edge leg intersecting at an angle corresponding to said refractory ring acute angle whereby the wiper ring is locked to the refractory ring, with the respective base and edge members substantially flush with one another.

3. A hot top bottom ring comprising, in combination, a refractory ring having an open center, said ring having a base face and an edge face, the edge face defining an acute angle with the base face, a wiper ring, said wiper ring having a base leg and an edge leg intersecting at an angle corresponding to said refractory ring acute angle, said wiper ring being mounted on said refractory ring with the respective base and edge members substantially flush with one another, a wiper blade formed integral with and extending outwardly from the edge leg of the wiper ring, the wiper ring being formed from two U-shaped members secured to each other at their ends in snug interlocking fit with the refractory ring.

4. A hot top bottom ring comprising, in combination, a refractory ring having an open center, said ring having a base face and an edge face, the edge face defining an acute angle with the base face, a wiper ring, said wiper ring having a base leg and an edge leg intersecting at an angle corresponding to said refractory ring acute angle, said wiper ring being mounted on said refractory ring with the respective base and edge members substantially flush with one another, a wiper blade formed integral with and extending outwardly from the edge leg of the wiper ring, spaced anchor loops defined in the wiper ring, and clips having anchor loop engaging means for securing the bottom ring to an associated hot top.

5. For use in a hot top, a hot top bottom ring comprising, in combination, a refractory ring, said refractory ring having a bottom face and an edge face, the bottom face being oriented in a plane substantially perpendicular with the vertical axis of an associated hot top, the edge face being tapered inwardly and upwardly from the plane of the bottom face, and a continuous wiper ring secured in snug interlocking fit around the hot top refractory ring, said ring having a base leg and edge leg proportioned to fit flush against the base face and edge face of the refractory *ring*, and a wiper blade formed integral with and extending outwardly from the top of the edge face of the ring for yieldable contact with the wall of an associated ingot mold.

6. For use in a hot top, a hot top bottom ring comprising, in combination, a refractory ring, said refractory ring having a bottom face and an edge face, the bottom face being oriented in a plane substantially perpendicular with the vertical axis of the associated hot top, the edge face being tapered inwardly and upwardly from the plane of the bottom face, and a continuous wiper ring secured in snug interlocking fit around the hot top refractory ring, said wiper ring having a base leg and edge leg proportioned to fit flush against the base face and edge face of the refractory *ring*, a wiper blade formed integral with and extending outwardly from the top of the edge face of the ring for yieldable contact with the wall of an associated ingot mold, means defining a recess in the refractory ring edge, and a crescent-shaped deformed portion of the wiper edge interlockingly engaging said refractory ring recess.

7. For use in a hot top, a hot top bottom ring comprising, in combination, a refractory ring, said refractory ring having a bottom face and an edge face, the bottom face being oriented in a plane substantially perpendicular with the vertical axis of an associated hot top, the edge face being tapered inwardly and upwardly from the plane of the bottom face, and a continuous wiper ring secured in snug interlocking fit around the hot top refractory ring, said wiper ring having a base leg and edge leg proportioned to fit flush against the base face and edge face of the refractory, means defining relief openings in the [wiper] base *leg* to permit forming to the refractory ring contour, and a wiper blade formed integral with and extending outwardly from the top of the edge face of the ring for yieldable contact with the wall of an associated ingot mold.

8. For use in a hot top, a hot top bottom ring comprising, in combination, a refractory ring, said refractory ring having a bottom face and an edge face, the edge face being tapered inwardly and upwardly from the plane of the bottom face, and a continuous wiper ring secured in snug fit around the hot top refractory ring, said wiper ring having a base leg and edge leg proportioned to fit flush against the base face and edge face of the refractory *ring*, and an intermittently peripherally slotted wiper blade formed integral with and extending outwardly from the top of the edge face of the ring for yieldable contact with the wall of an associated ingot mold.

9. A hot top bottom ring in accordance with claim 8 wherein said wiper ring is of resilient weldable metallic material.

[10. A prestressed hot top bottom ring comprising, in combination, a refractory ring having an open center and having a continuous flanged portion extending around the external periphery of the ring, said flanged portion presenting a cross-sectional profile with a peripherally constant external contour and; a wiper ring having a body portion shaped to engage, and mounted in tension upon, said refractory ring flanged portion and a wiper blade integral with said body portion; said wiper ring being mounted on said refractory ring flanged portion to extend outwardly thereof; whereby the tension of the wiper ring places the continuous flanged portion in compression and thereby prestresses the hot top bottom ring.]

[11. A hot top bottom ring comprising, in combination, a refractory ring having an open center and having a continuous flanged portion extending around the external periphery of the ring, said flanged portion presenting a cross-sectional profile with a peripherally constant external contour; a wiper ring having a body portion shaped to engage said refractory ring flanged portion and a wiper blade integral with said body portion and extending past said body portion, said wiper ring being mounted on said refractory ring flanged portion, and means for securing said wiper ring to said refractory ring, including first securing means integral with said wiper ring.]

[12. In combination with a hot top, a bottom ring assembly, comprising, in combination, a refractory ring having an open center and having a continuous flanged portion extending around the external periphery of the ring, said flanged portion presenting a cross-sectional profile with a peripherally constant external contour; a wiper ring having a body portion shaped to engage said refractory ring flanged portion and a wiper blade integral with said body portion and extending past said body portion, said wiper ring being mounted on said refractory ring flanged portion; and means for securing said wiper ring to said refractory ring, including first securing means integral with said wiper ring, and a second securing means engageable with said first securing means for connecting said first securing means with at least one of said bottom ring and the hot top.]

[13. A hot top bottom ring comprising, in combination, a refractory ring having an open center and having a continuous flanged portion extending around the external periphery of the ring, said flanged portion presenting a cross-section profile with a peripherally constant external contour; a wiper ring of strip material formed to define an integral structure of substantially uniform cross-section having a body portion shaped to engage said refractory ring flanged portion, a wiper blade integral with said body portion and extending past said body portion, said wiper ring being mounted on said refractory ring flanged portion, and first securing means integral with said wiper ring and intermittently engaging a portion of the peripherally constant external contour of said refractory ring flanged portion.]

[14. In combination with a hot top, a bottom ring assembly comprising, in combination, a refractory ring having an open center and having a continuous flanged portion extending around the external periphery of the ring, said flanged portion presenting a cross-sectional profile with a peripherally constant external contour; a wiper ring of strip material formed to define an integral structure of substantially uniform cross-section having a body portion shaped to engage said refractory ring flanged portion and a wiper blade integral with said body portion and extending past said body portion, said wiper ring being mounted on said refractory ring flanged portion; and means for securing said bottom ring to said hot top ring, including first securing means integral with said wiper ring, and a second securing means engageable with said first securing means for connecting said first securing means with said hot top.]

[15. A method of making a hot top bottom ring comprising forming a refractory ring having an open center and having a continuous flanged portion extending around the external periphery of the ring; said flanged portion presenting a cross-sectional profile with a peripherally constant external contour; forming a wiper ring from a strip of material by shaping the cross-section of a wiper ring body portion to matingly engage said refractory ring flanged portion, forming a wiper blade integral with said body portion to extend outwardly past said body portion, and forming securing means in said wiper ring body to effect at least a portion of a connection with said refractory ring; and surrounding said refractory ring with said wiper ring by bending the latter into mating engagement of its body portion with said flanged portion.]

[16. A method of making a hot top bottom ring having a refractory ring with an open center and with a flanged portion extending around the external periphery of the ring upon which is a wiper strip, and comprising the steps of forming a wiper ring from a strip of material by shaping the cross-section of a wiper ring body portion to matingly engage said refractory ring flanged portion by forming a wiper blade integral with said body portion to extend outwardly past said body portion, and by forming securing means to effect at least a portion of a connection with said refractory ring; and forming said refractory ring inside said wiper ring with said flanged portion matingly engaging the body portion of said wiper ring.]

[17. A hot top comprising, in combination, a refractory ring construction having an open center and having a continuous flanged portion extending around the external periphery of the ring, said flanged portion presenting a cross-sectional profile with a peripherally constant external contour, a wiper ring having a body portion shaped to engage said refractory ring flanged portion, and a wiper blade integral with said body portion and extending past said body portion, said wiper ring being mounted on said refractory ring flanged portion, the whole in such combination that the wiper ring interlocks with the refractory ring to prevent disengagement therefrom.]

[18. A hot top according to claim 17 wherein the flanged portion of said refractory ring is a monolithic member.]

[19. A hot top according to claim 17 wherein the refractory ring comprises a plurality of interfitted slab members.]

[20. A method of making a hot top having a refractory ring with an open center and with a flanged portion extending around the external periphery of the rim upon which a wiper ring is mounted, said method comprising the steps of forming a wiper ring from a strip of material but shaping the cross-section of a wiper ring body portion to matingly engage said refractory ring flanged portion by forming a wiper blade integral with said body portion to extend outwardly past said body portion, and by forming securing means to effect at least a portion of a connection with said refractory ring, forming said refractory ring inside said wiper ring with said flanged portion matingly engaging the body portion of said wiper ring, passing the refractory ring through an oven wherein the refractory ring is heated to the baking temperature of the refractory ring, bringing the wiper ring to the refractory ring temperature, assembling the now-heated wiper ring to the refractory ring, and welding the wiper ring ends together in its final configuration prior to the cooling of the refractory in such manner that the varying thermal coefficients of expansion will provide for more rapid shrinking of the wiper ring than the refractory, thereby pre-stressing the entire assembly.]

[21. A prestressed hot top bottom ring comprising the combination of a refractory ring having an open center, a base face, and an externally peripherally extending edge face; the base and edge faces being disposed at an angle to each other; and a continuous wiper ring, mounted in tension upon and surrounding said refractory ring;

said wiper ring having a base leg and an edge leg disposed at an angle to each other and respectively mounted relative to said refractory ring flush with said base and edge faces;

said wiper ring further including a wiper blade extending from the edge leg outwardly of the hot top bottom ring;

whereby the bottom ring is prestressed by the refractory ring being in compression responsive to the tension of the wiper ring.]

*22. A method of making a hot top bottom ring comprising the steps of*

*forming a refractory ring having an open center and a continuous flanged portion extending around the external periphery of the ring, said flanged portion presenting a cross-sectional profile with a peripherally constant external contour,*

*forming a wiper ring by shaping a pair of strips of material to include a body portion shaped to matingly engage said refractory ring flanged portion at least one of said strips having a length greater than one-half the circumference of the wiper ring and a wiper blade extending upwardly and outwardly from said body portion,*

*bending each strip into mating engagement with the flanged portion of said refractory ring with the ends of the strips overlapping each other on opposite sides of said refractory ring,*

*heating said strips to increase the amount of overlap at their ends,*

*welding the overlapping ends of said strips while the strips are still hot to form the wiper ring, and*

*allowing the wiper ring to cool and shrink on the flanged portion of the refractory ring.*

References Cited

The following references, cited by the Examiner, are of record in the patented file of this patent or the original patent.

UNITED STATES PATENTS

| | | | |
|---|---|---|---|
| 1,945,880 | 2/1934 | Charman. | |
| 1,997,677 | 4/1935 | Charman | 249—201 |
| 2,030,199 | 2/1936 | Charman | 249—61 |
| 2,258,483 | 10/1941 | Charman | 249—202 |
| 2,914,824 | 12/1959 | Marcec | 249—201 |
| 2,952,055 | 9/1960 | Gottschalk. | |
| 3,044,133 | 7/1962 | Marcec | 249—202 |
| 3,046,625 | 7/1962 | Carpenter | 249—201 |
| 3,058,182 | 10/1962 | Urmetz et al. | 249—202 |

J. SPENCER OVERHOLSER, *Primary Examiner.*

V. K. RISING, *Assistant Examiner.*